United States Patent [19]
Zhengdi

[11] Patent Number: 5,706,275
[45] Date of Patent: Jan. 6, 1998

[54] DATA TRANSMISSION METHOD, TRANSMITTER, AND RECEIVER

[75] Inventor: Qin Zhengdi, Oulu, Finland

[73] Assignee: Nokia Telecommunications Oy, Espoo, Finland

[21] Appl. No.: 682,697

[22] PCT Filed: Nov. 28, 1995

[86] PCT No.: PCT/FI95/00655

§ 371 Date: Jul. 26, 1996

§ 102(e) Date: Jul. 26, 1996

[87] PCT Pub. No.: WO96/17446

PCT Pub. Date: Jun. 6, 1996

[30] Foreign Application Priority Data

Nov. 29, 1994 [FI] Finland ................. 945630

[51] Int. Cl.$^6$ ................................... H04J 13/00
[52] U.S. Cl. ................... 370/204; 370/210; 370/342; 370/441; 375/201; 375/206
[58] Field of Search .................. 370/210, 204, 370/209, 342, 441, 479, 343, 480, 482, 485, 497, 465, 335, 320, 203; 375/200, 201, 205, 206, 207, 208, 209, 210, 259, 260, 340, 343

[56] References Cited

U.S. PATENT DOCUMENTS

| | | | |
|---|---|---|---|
| 3,808,412 | 4/1974 | Smith | ................. 370/210 |
| 4,943,975 | 7/1990 | Kurihara et al. | |
| 5,008,899 | 4/1991 | Yamamoto | |
| 5,175,743 | 12/1992 | Crespo et al. | ................. 370/210 |

FOREIGN PATENT DOCUMENTS

| | | |
|---|---|---|
| 2 285 371 | 7/1995 | United Kingdom |
| 93/10604 | 5/1993 | WIPO |
| 95/10145 | 4/1995 | WIPO |

*Primary Examiner*—Wellington Chin
*Assistant Examiner*—Huy D. Vu
*Attorney, Agent, or Firm*—Cushman Darby & Cushman Intellectual Property Group of Pillsbury Madison & Sutro LLP

[57] ABSTRACT

A receiver, and a data transmission method in a system wherein the CDMA multiple access method in a system wherein the CDMA multiple access method is utilized and wherein each data signal to be transmitted is multiplied by a pseudorandom code of a certain length, having a bit rate that is higher than that of the data signal to be transmitted. In order to ensure fast and inexpensive reception, the signal multiplied by the pseudorandom code is further modulated by a group of waveforms ($f_1 \ldots f_N$) the number of which equals the number of bits in the pseudorandom code, the frequency domain given. The signal is converted in the receiver into a digital form and multiplied by the pseudorandom code which has been subjected to an inverse Fourier transform, and the multiplied signal is subjected to a Fourier transform.

12 Claims, 2 Drawing Sheets

DATA TRANSMISSION METHOD, TRANSMITTER, AND RECEIVER

BACKGROUND OF THE INVENTION

The invention relates to a data transmission method in a system wherein the CDMA multiple access method is utilized and wherein each data signal to be transmitted is multiplied by a pseudorandom code of a certain length, having a bit rate that is higher than that of the data signal to be transmitted.

CDMA (Code Division Multiple Access) is a multiple access method, which is based on the spread spectrum technique and which has been applied recently in cellular radio systems, in addition to the prior FDMA (Frequency Division Multiple Access) and TDMA (Time Division Multiple Access) methods. CDMA has several advantages over the prior methods, for example spectral efficiency, the simplicity of frequency planning and traffic capacity.

In the CDMA method, the narrow-band data signal of the user is conventionally multiplied to a relatively wide band of a traffic channel by a spreading code having a considerably broader band than the data signal. In known cellular network test systems, traffic channel bandwidths such as 1.25 MHz, 10 MHz and 25 MHz have been used. In connection with multiplying, the data signal spreads to the entire band to be used. All users transmit by using the same frequency band, or traffic channel, simultaneously. A separate spreading code is used over each connection between a base station and a subscriber terminal, and the signals of the users can be distinguished from one another in the receivers on the basis of the spreading code of each connection.

Correlators provided in the conventional CDMA receivers are synchronized with a desired signal, which they recognize on the basis of the spreading code in the signal. The data signal is restored in the receiver to the original band by multiplying it again by the same spreading code as during the transmitting stage. Signals multiplied by some other spreading code during the transmitting stage do not correlate in an ideal case with the spreading code used in the receiver, and they are therefore not restored to the narrow band. They appear thus as noise with respect to the desired signal. The spreading codes of the system are preferably selected in such a way that the codes used in each system cell are mutually orthogonal, i.e. they do not correlate with each other.

The most time-consuming process in a CDMA transceiver implemented in known manners is correlation, and, simultaneously, the most expensive component is the correlator situated in the receiver. In the correlator, a received signal is compared bit by bit with a known spreading code, and the comparison produces a correlation value.

SUMMARY OF THE INVENTION

The purpose of the present invention is to provide a data transmission method which utilizes CDMA and in which the use of correlation can be replaced with a faster and more effective method.

Instead, the signal multiplied by the pseudorandom code is further modulated by a group of waveforms the number of which equals the number of bits in the pseudorandom code, the frequency of each waveform being included in the frequency domain given.

The invention also relates to a transmitter comprising means for multiplying each data signal to be transmitted by a pseudorandom code of a certain length, having a bit rate that is higher than that of the data signal to be transmitted. The transmitter according to the invention comprises means for modulating the signal multiplied by the pseudorandom code by a group of waveforms the number of which equals the number of bits in the pseudorandom code, the frequency of each waveform being included in the frequency domain given.

The invention also relates to a receiver comprising means for converting a received analog signal into a digital form, and means for generating a desired pseudorandom code. The receiver according to the invention comprises means for subjecting the desired pseudorandom code to an inverse Fourier transform, and means for multiplying the digitized received signal by the converted pseudorandom code, and means for subjecting the multiplied signal to a Fourier transform.

In the method according to the invention wherein the signal to be transmitted is not only multiplied by a spreading code but also modulated by a number of waveforms, the signal to be transmitted is subjected to a kind of inverse Fourier transform to the frequency domain. As a result of modulation, the spreading code is distributed in the frequency domain at desired intervals. The actual signal to be transmitted is thus the sum of the waveforms, which are dependent on the spreading code used over the connection. In practice the transmitter can thus utilize a certain number of waveforms on given frequencies, and the bits of the spreading code of each connection determine the waveforms that are sent over each connection. The frequencies of the waveforms can be selected on the basis of the properties of the radio path.

In a receiver according to the invention, a received signal can be multiplied by the spreading code that has been subjected to an inverse Fourier transform. This can replace the conventional correlation operation, wherefore the process becomes considerably faster and simpler to implement.

BRIEF DESCRIPTION OF THE DRAWINGS

In the following, the invention will be described in greater detail with reference to the examples of the accompanying drawings, in which.

DETAILED DESCRIPTION

In the following, the method, transmitter and receiver according to the invention will be described in greater detail utilizing the cellular system as an example of a telecommunication system wherein the method according to the invention is applied. However, the invention can also be applied in several other types of systems besides those utilizing cellular technology, for example in telecommunication systems utilizing power lines.

Figure 1:
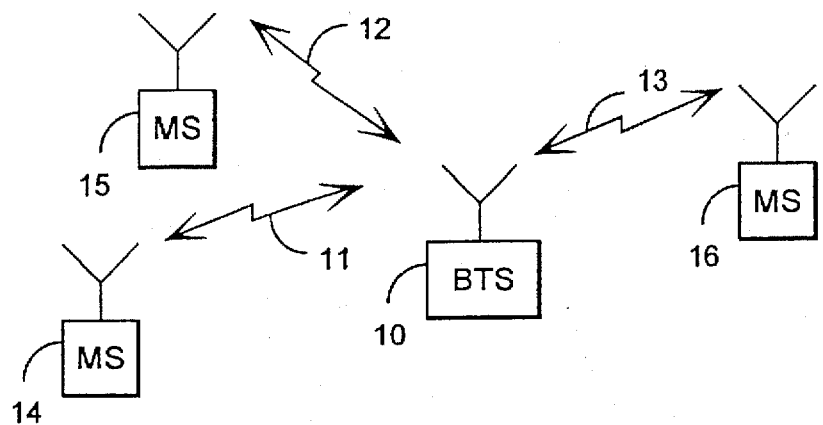
FIG. 1 illustrates a telecommunication system in which the method according to the invention can be applied.

FIG. 1 illustrates an example of a cellular system wherein the method according to the invention can be applied. The system comprises a base station 10, which has a bidirectional connection 11–13 with each subscriber terminal 14–16 engaged in a call in the area. According to CDMA principles, the traffic of all terminal equipment in each transmission direction occurs in the same frequency domain, and every connection utilizes its own spreading code unique to that connection.

In the method according to the invention, a narrow-band data signal of a user is first multiplied, according to conventional CDMA principles, by a spreading code which is unique to each user within the same coverage area. The length of the spreading code, i.e. the number of the bits in the code, is denoted by N. As a result of multiplication, the narrow-band data signal spreads to the given frequency band that is determined by the bit rate of the spreading code. The thus obtained broad-band signal is supplied for modulation by a group of orthogonal frequencies $f_1 \ldots f_N$, the number of which equals the number N of the bits in the spreading code. As a result of modulation, the signal to be transmitted consists of the sum signal of the orthogonal frequency components, which depend on the spreading code used.

The mutual intervals between the aforementioned frequencies $f_1 \ldots f_N$ in the frequency domain can be selected freely. The intervals between the frequencies does not have to be constant. In some embodiments, it may be preferable to center more frequencies in a section of the band and to decrease the number of frequencies in other sections of the band, for example according to the properties of the transmission channel used. It is possible, for example, to place several frequencies in the middle of the frequency band and to reduce the density of frequency placement near the edges of the band.

Figure 2:
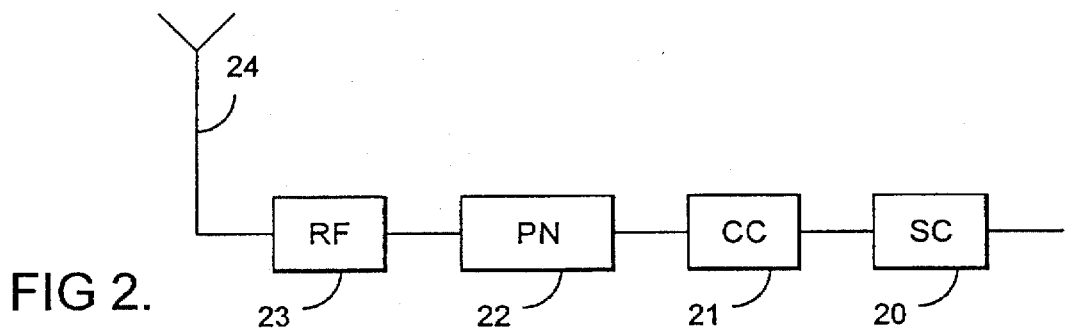
FIG. 2 is a block diagram of the structure of a transmitter according to the invention.

FIG. 2 is a general block diagram illustrating the structure of a CDMA transmitter according to the invention. The transmitter comprises means 20 for performing speech coding on the signal to be transmitted, and means 21 for performing channel coding on the speech-coded signal. The channel-coded signal is then supplied to means 22 wherein the data signal to be transmitted is subjected to multiplication by the spreading code of the user. The transmitter according to the invention further comprises means 22 performing the modulation of the signal, which was multiplied by the spreading code, by a number of waveforms, the obtained modulated waveforms being summed up in the means. The obtained sum signal is supplied via radio-frequency means 23 for transmission by an antenna 24.

Figure 3:
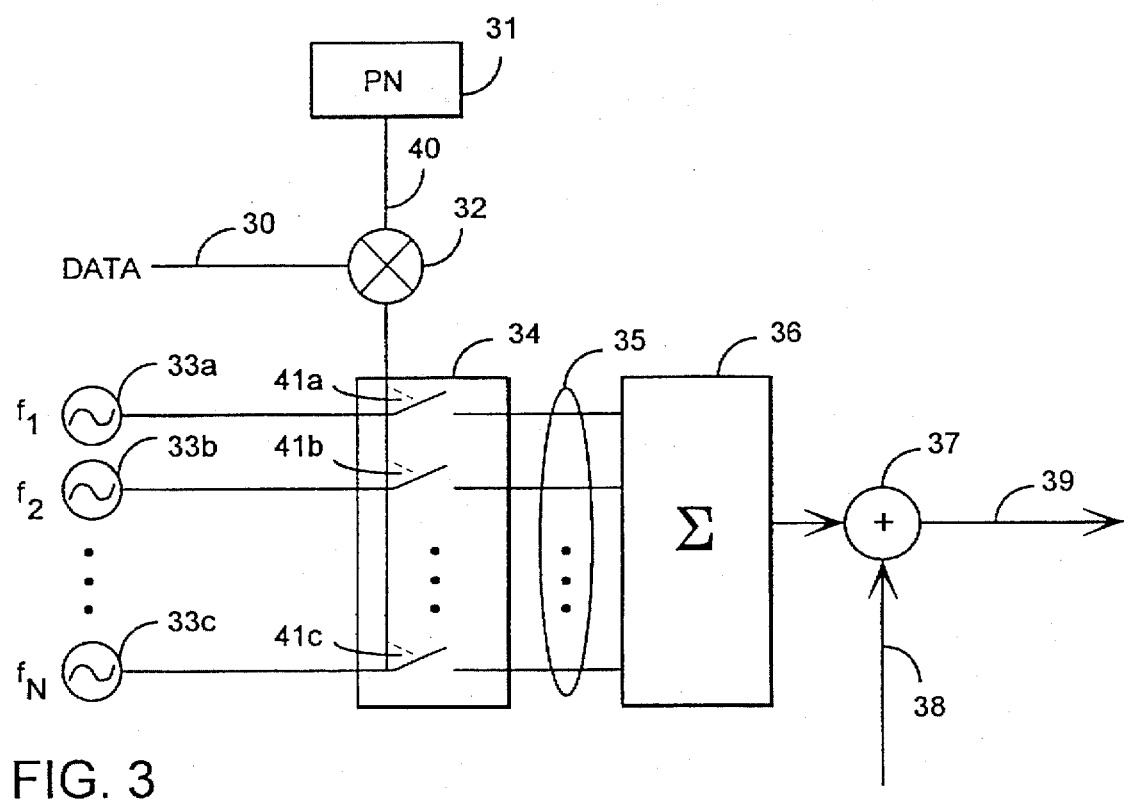
FIG. 3 is a more detailed block diagram of the structure of a transmitter according to the invention.
Figure 4A:
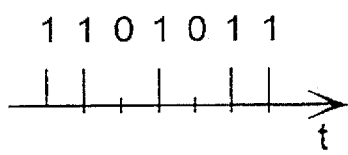
FIG. 4a shows a signal to be transmitted in the time domain after multiplication by a spreading code.

FIG. 3 illustrates in greater detail the structure of a transmitter implementing the method according to the invention. The transmitter comprises means 31 for generating the spreading code 40 of the user, characteristic of the connection, and means 32 for multiplying the data signal 30 to be transmitted by this spreading code. Assume for example that the spreading code used is 1101011. The length N of the spreading code is thus 7. In the actual system, the spreading codes are naturally considerably longer. In a multiplier 32, each bit of the data signal 30 is multiplied by the spreading code 40. The possible shape of the signal in the time domain after the multiplication by the spreading code is illustrated in FIG. 4a. The multiplied signal forms a bit sequence having the bit rate of the spreading code.

The transmitter further comprises N generators 33a to 33c having outputs that contain waveforms $f_1 \ldots f_N$. The waveforms can be, for example, sinusoidal frequencies. The transmitter also comprises means 34 the operation of which is controlled by a bit sequence obtained from the output of the multiplier 32, the input of the means 34 consisting of the output signals of the aforementioned generators 33a to 33c. The means 34 can be realized, for example, by means of N switches 41a to 41c, so that a corresponding waveform $f_1$ is supplied to each switch 41i, i=1, ... N, as the input, and that each switch is controlled by a corresponding number i bit in the bit sequence obtained from the output of the multiplier 32. If the number i bit of the bit sequence has the value '1' or some other corresponding value, the corresponding switch is opened for the duration of the bit. Correspondingly, if the number i bit of the bit sequence has the value '0' or some other corresponding value, the switch is closed for the duration of the bit. The transmitter further comprises means 36 for summing the output signals 35 of the switching means 34, and the obtained summed signal forms the signal of the user to be transmitted. The described method can be considered as an inverse Fourier transform, which is performed on the signal to be transmitted.

Figure 4B:
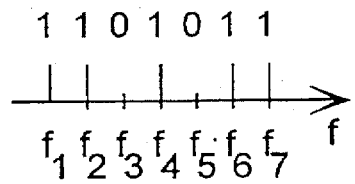
FIG. 4b shows a signal to be transmitted in the frequency domain after modulation by waveforms.

A possible shape of the signal in the frequency domain is illustrated in FIG. 4b, assuming that the spreading code used is the aforementioned 1101011 and that the modulating waveforms are sinusoidal signals. In this case, the signal consists of a number of signal components having, in this example, the frequencies of $f_1$, $f_2$, $f_4$, $f_6$ and $f_7$, i.e. the frequencies for which the bits of the bit sequence have the value '1'.

If the transmitter is such that it transmits signals of several users simultaneously, for example as in a base station transmitter, it comprises means 37 for adding the signals 38 of other users, formed in a similar manner, to the signal to be transmitted. The obtained sum signal 39 is supplied further to radio-frequency parts. The same group of orthogonal waveforms $f_1 \ldots f_N$ is used in the composition of signals of all users, but the waveform components of the composed signal of each user vary since the spreading codes of the users differ from one another.

In the method according to the invention, in addition to sinusoidal signals, the modulating waveforms may also be other kinds of waveforms, for example signals generated by means of a binary orthogonal function, such as the Walsh function. When the Walsh functions is used, the transmitter operates as described above except that instead of the frequency generators 33a to 33c, means generating orthogonal signals according to the Walsh function $W_0 \ldots W_{N-1}$ are used. The summed output signal of the switching means 34 thus comprises a combination of the set of the Walsh function.

When the data transmission method according to the invention is applied in the receiver, the received digitized signal can be subjected to a Fourier transform according to the length of the spreading code used. This converts the received CDMA signal into a normal shape, whereafter the signal can be correlated with the spreading code used in the transmission by use of conventional methods.

The method according to the invention is most preferably applied in such a way that the correlation is performed before the Fourier transform. The correlation then becomes multiplication, which is considerably easier to perform. This is performed in such a way that the received digitized signal is multiplied by the spreading code which has been subjected to an inverse Fourier transform. The signal thus obtained is subjected to a Fourier transform, whereafter the original data signal is obtained. The advantage of this method is that it is fast and inexpensive to implement, compared to the use of a correlator.

Figure 5:
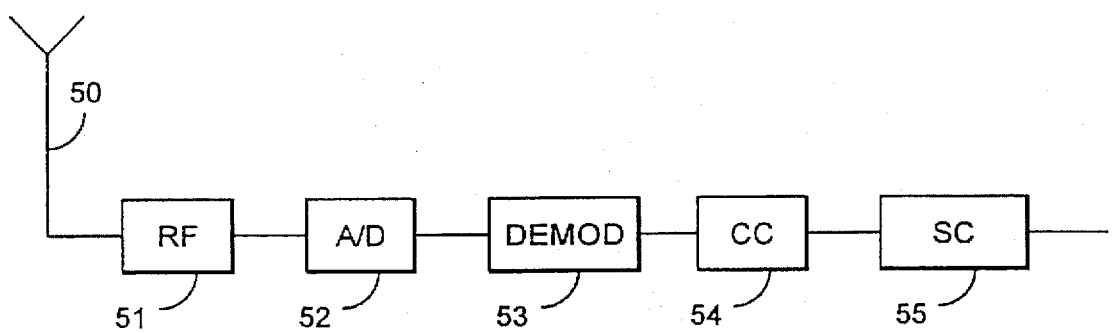
FIG. 5 is a block diagram of the structure of a receiver according to the invention.

FIG. 5 is a general block diagram illustrating the structure of a CDMA receiver according to the invention. The receiver comprises an antenna 50 receiving a signal that is supplied via radio-frequency parts 51 to converter means 52 wherein the received signal is converted into a digital form. The digitized signal is further supplied to demodulation means 53, wherein the signal is correlated with the spreading code used and wherein the required Fourier transforms are performed. The output signal of the demodulation means 53 that is restored to the original narrow band is supplied to a channel decoder 54 and from there to other parts of the receiver, for example to a speech decoder 55.

Figure 6:
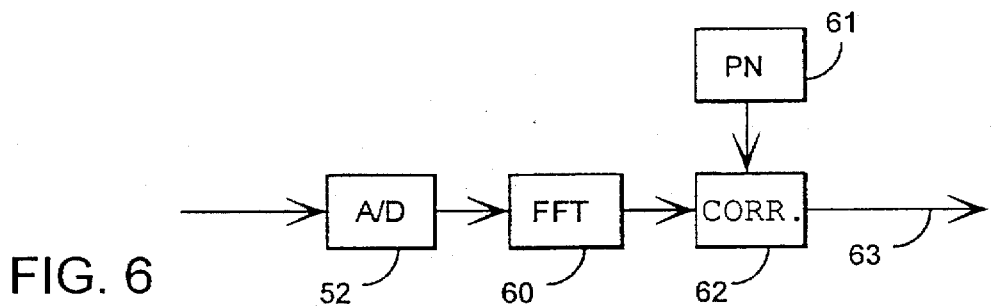
FIG. 6 is a more detailed block diagram of the structure of a receiver according to the invention.

FIG. 6 illustrates in greater detail the structure of a receiver implementing the method according to the invention. The receiver comprises means 52 for converting a received analog signal into a digital form. The digitized signal is supplied to converter means 60 wherein the signal is subjected to a Fourier transform. The converted signal is supplied further to correlation means 62 wherein the signal is correlated with a spreading code generated in means 61. The spreading code used in the correlation is the same that was used in the transmission of the signal. The correlated signal 63, which has been restored to the original band during correlation, is further supplied to other parts of the receiver.

Figure 7:
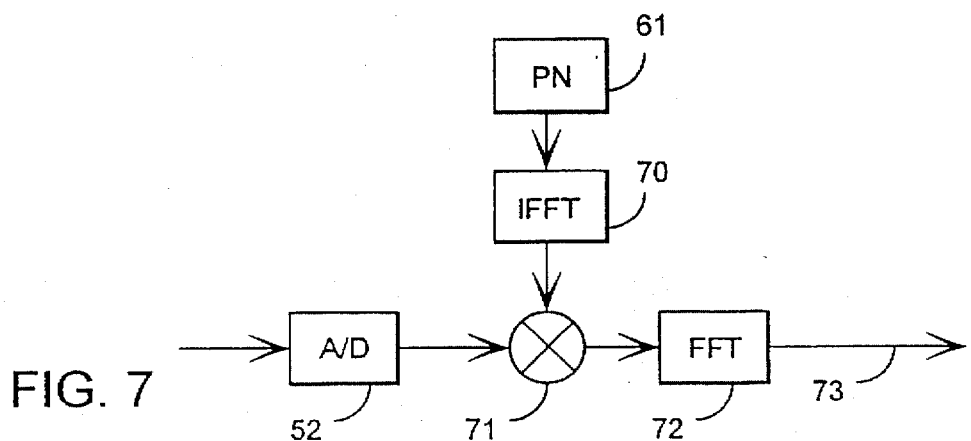
FIG. 7 is a more detailed block diagram of the structure of another receiver according to the invention.

FIG. 7 illustrates a possible structure of a receiver according to a preferred embodiment of the invention. The receiver comprises means 52 for converting a received analog signal into a digital form. The receiver comprises means 61 for generating the required spreading code that is the same that was used in the transmission of the signal. The spreading code is supplied to first converter means 70 wherein the spreading code is subjected to an inverse Fourier transform. The receiver comprises a multiplier 71 wherein the received digitized signal is multiplied by the output signal of the first converter means 70. The output signal of the multiplier 71 is supplied to second converter means 72 wherein the signal is subjected to a Fourier transform. The obtained signal 73 is then supplied to other parts of the receiver, for example to a channel decoder.

Even though the invention is described above with reference to the example according to the accompanying drawings, it is clear that the invention is not limited thereto, but it can be varied in many ways within the scope of the inventive idea disclosed in the appended claims.

I claim:

1. A data transmission method in a system wherein the CDMA multiple access method is utilized, comprising:

multiplying each data signal be transmitted by a transmitter by a pseudorandom code of a certain length, having a bit rate that is higher than that of the data signal to be transmitted;

further multiplying the signal multiplied by the pseudorandom code by a group of waveforms ($f_1 \ldots f_N$) the number of which equals the number of bits in the pseudorandom code, the frequency of each waveform being included in a given frequency domain.

2. A method according to claim 1, including:

each bit sequence formed by a data signal and multiplied by a pseudorandom code controlling a group of switches the number of which equals the number of bits in said bit sequence, said switches controlling a corresponding number of frequency synthesizers in such a way that if the value of a bit in the bit sequence is a first given value, the corresponding switch is open, and if the value of a bit in the bit sequence is a second given value, the corresponding switch is closed;

summing the output signals of the switches in the transmitter.

3. A method according to claim 1, including:

when several data signals are transmitted simultaneously, summing the modulated signals to be transmitted in the transmitter.

4. A method according to claim 1, wherein:

said group of waveforms ($f_1 \ldots f_N$) consists of sinusoidal signals.

5. A method according to claim 1, wherein:

said waveform ($f_1 \ldots f_N$) have differences between them which are not all equal to one another.

6. A method according to claim 1, including:

forming said waveforms ($f_1 \ldots f_N$) by use of Walsh functions.

7. A method according to claim 1, including:

transmitting the further modulated signal by the transmitter;

receiving the further modulated signal by a receiver to provide a receiver signal;

converting the received signal into a digital form and multiplying the received signal by a pseudorandom code that has been subjected to an inverse Fourier transform; and subjecting the multiplied signal to a Fourier transform.

8. A method according to claim 1, including:

transmitting the further modulated signal by the transmitter;

receiving the further modulated signal by a receiver to provide a receiver signal;

converting the received signal into a digital form;

subjecting the received signal to a Fourier transform to provide a converted signal; and correlating said converted signal a pseudorandom code.

9. A transmitter, comprising;

means for multiplying each data signal to be transmitted by a pseudorandom code of a certain length, having a bit rate that is higher than that of the data signal to be transmitted; and modulating means for modulating the signal multiplied by the pseudorandom code by a group of waveforms ($f_1 \ldots f_N$) the number of which equals the number of bits in the pseudorandom code, the frequency of each waveform being included in a given frequency domain.

10. A transmitter according to claim 9, including:

a plurality of frequency synthesizers; said modulating means comprising a group of switching means comprising a plurality switches the number of which equals the number of bits in the pseudorandom code;

the input signals of the switches consisting of a corresponding number of output signals of said frequency synthesizers;

the control signals of the switches consisting of the bits in the bit sequence formed by the data signal multiplied by the pseudorandom code and means for combining the output signals of the switches.

11. A transmitter according to claim 9, further comprising:

means for combining several data signals as multiplied by a said pseudorandom code and modulated by a said group of waveforms ($f_1 \ldots f_N$), to be transmitted simultaneously.

12. A receiver, comprising:

means for converting a received analog signal into a digital form;

means for generating a desired pseudorandom code;

means for subjecting the desired pseudorandom code to an inverse Fourier transform to generate a converted pseudorandom code;

means for multiplying the digitized received signal by the converted pseudorandom code; and means for subjecting the multiplied signal to a Fourier transform.

* * * * *